Sept. 15, 1970　　　H. F. BARRETT ET AL　　　3,528,817
METHOD AND APPARATUS FOR MAKING FERMENTABLE BEVERAGES
Filed Dec. 22, 1967

INVENTORS.
HAROLD F. BARRETT
DONALD J. SCHNEIDER
MARION C. STRICKLAND
JAMES H. CHILDERS

BY Colton + Stone

ATTORNEYS.

3,528,817
METHOD AND APPARATUS FOR MAKING FERMENTABLE BEVERAGES
Harold F. Barrett, Bowie, and Donald J. Schneider, Forestville, Md., Marion C. Strickland, Vienna, Va., and James H. Childers, Oxon Hill, Md., assignors to Harold F. Barrett and Anthony Fusco, both of Bowie, Md.
Filed Dec. 22, 1967, Ser. No. 692,827
Int. Cl. C12g 1/00
U.S. Cl. 99—35       7 Claims

ABSTRACT OF THE DISCLOSURE

Fermented alcoholic beverages are prepared by a process and apparatus that involves accelerating the fermentation rate by containing the gases evolved during fermentation in a resilient bladder of stretchable material in open communication with the fermenting mixture.

BACKGROUND OF THE INVENTION

The invention relates to a method and apparatus for making fermented beverages such as wine or the like and is primarily concerned with the production of non-effervescent type beverages.

Heretofore, the production of fermented beverages has required long periods of time during which the fermentation reaction proceeds; such periods of time normally involving from one to three years. Because of the substantial periods of time involved, it is not feasible to produce these beverages in small batches, such as for home use.

SUMMARY OF THE INVENTION

It is a primary object of the invention to provide a novel method of producing fermented beverages in an extremely short period of time as compared to presently existing methods, thus making feasible the production of small batch lots in the home for personal consumption.

Another object of the invention is to provide novel apparatus for use in making fermented beverages in accordance with the invention that is safe, easy to use and economical to manufacture.

It is among the further objects of the invention to provide a method and apparatus that, while particularly adaptable for producing small batch lots of fermented beverages for home use, will find ready acceptance in commercial beverage production wherein the great reduction in fermentation time made possible in the practice of the invention will greatly reduce production cost; to provide a method of producing fermented beverages that does not require mechanically moving parts such as valves, pumps or the like; and to provide apparatus that may be easily cleaned for re-use.

The method, according to the invention, involves the retention of carbon dioxide and other gaseous products evolved during the fermentation process in open communication with the fermentable mixture. In the usual process of producing non-effervescent fermented beverages, the gaseous products evolved during the fermentation reaction are vented from the fermenting apparatus through a water seal or other valving means that precludes entry of air into the apparatus which normally retards the fermentation rates in the production of fine wines and like beverages. Although the precise chemical reactions and the theoretical considerations underlying the fantastically accelerated fermentation rate achieved in accordance with the practice of the invention are not completely understood; it has been found that if the gaseous products evolved during fermentation are resiliently contained in contact with the fermenting liquid, the rate of fermentation is greatly accelerated. For example, grape wines produced in accordance with the invention are completely fermented in less than three weeks and are comparable in quality to wines produced in a conventional manner requiring up to three years fermentation time. The results achieved by the use of a resilient containing means for the gases is far superior in accelerating fermentation rate as compared to a rigid containment of the gases. One possible explanation for the improved results obtained with the resilient containment as compared to rigidly containing the gases is that as the gaseous pressure increases, the resilient containment is able to expand and thereby maintain the gases at a lesser pressure than would be the case with a rigid enclosure. In connection with this explanation, it may be assumed that the fermentation rate is actually retarded once the gaseous pressure exceeds that which would be required to expand the resilient containment which would explain the unsatisfactory comparative results obtained with a rigid enclosure.

In any event, it has been found that by containing the gases in the manner herein described, the objects of the invention are achieved in the production of a completely palatable beverage in an extremely short period of time.

In essence, the method according to the invention involves the evacuation of an expansion chamber that is in constant open communication with a fermentable mixture followed by sealing the mixture and evacuated chamber from atmosphere and allowing fermentation to proceed. The initial rapid rate of fermentation, as evidenced by the rate of gaseous evolution, probably results from the greater differential in partial pressures across the liquid-gas interface due to the initial evacuation. As evolved gas pressure above the liquid mixture increases sufficiently to expand the chamber, the rapid fermentation rate continues and it is surmised that some of the gases may be re-dissolved to provide a greater concentration of the reactants than would be the case were the evolved gases vented from the fermenting apparatus.

An additional advantage in the use of an expansible chamber is to preclude the necessity of providing high strength materials and/or valves or pumps to pressurize and retain the evolved gases within desired pressure ranges.

As would be expected from the foregoing discussion, the expansible chamber may be initially charged with an external source of carbon dioxide to produce an accelerated fermentation rate. This is generally not desirable inasmuch as the initial charge taken with the gases evolved during fermentation requires either that a much larger chamber be used or the pressure be bled off periodically.

Although the practice of the foregoing method, in its simplest form, may suggest merely placing a collapsed balloon over the open end of a container having a fermentable mixture therein the results obtained in this manner are completely unsatisfactory. One reason for this is that all of the residual air cannot be removed from contact with the mixture even if the balloon be collapsed prior to application to the container neck. This is because that portion of the balloon immediately adjacent the container neck cannot be collapsed and, also, residual air remains within the container above the mixture level. An attempt to completely fill the container results in the mixture being splashed on the walls of the balloon as gas is being evolved which subsequently cakes and renders the balloon unfit for further use. Additionally, most commercial balloons are porous, to some extent, permitting ingress of air under conditions of partial vacuum and egress of carbon dioxide under internal pressure conditions.

The expansible chamber preferably consists of a resilient bladder which may or may not have an outer rigid cage to limit its expansion. In the case of a rubber bladder the same may be readily folded into a compact form for vending or storage and may be cleaned for re-use indefinitely. The interior of the bladder may be maintained in open communication with a rigid container in which the fermentable mixture is disposed by inserting the container neck through an appropriately sized opening in the bladder and clamping the same. By means of a piece of surgical tubing or the like communicating with the interior of the bladder, the residual air in the bladder and container may be orally evacuated and the tube sealed from atmosphere as by a pinch clamp. The purpose of the foregoing is to provide a closed evacuated system including a rigid container having a fermentable mixture therein and a communicating resilient expansion chamber to receive evolved gases.

DESCRIPTION OF THE DRAWING

The attainment of the foregoing and other objects will become more apparent from the ensuing description when considered in conjunction with the drawing wherein.

DESCRIPTION OF THE PREFERRED EMBODIMENTS

Figure 1:
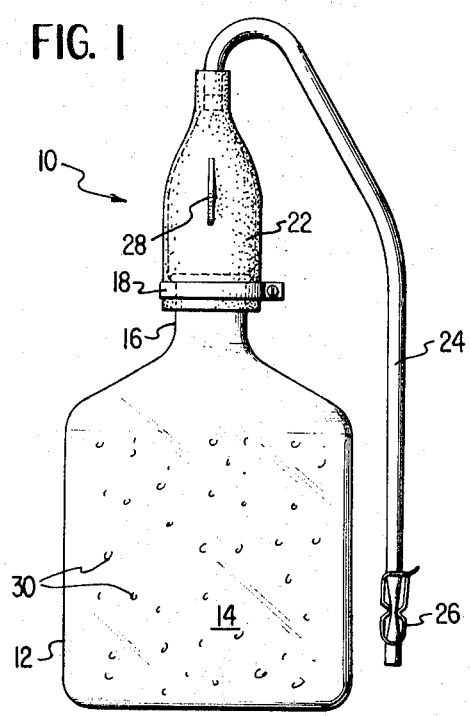
FIG. 1 is an elevational view illustrating one form of fermenting apparatus that may be used in the practice of the invention.
Figure 2:
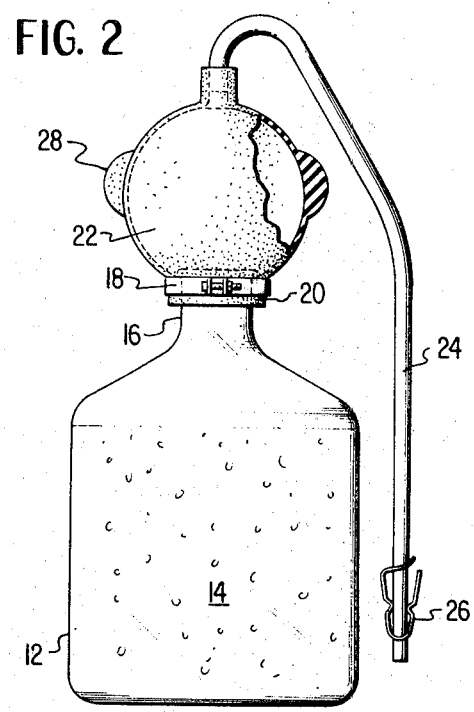
FIG. 2 is an elevational view of the apparatus shown in FIG. 1 illustrating the bladder in distended condition and in which the bladder is displaced 90° from the FIG. 1 position.

One form of fermenting apparatus 10 for carrying out the invention is depicted in FIGS. 1 and 2 includes a rigid container 12, such as a glass jug, containing a fermentable mixture 14. The neck 16 of jug 12 has removably secured thereto, as by a C-clamp 18, a correspondingly sized neck portion 20 of a rubber bladder 22 that creates a fluid tight seal between the jug and the bladder while maintaining constantly open communication therebetween. Rubber tubing 24, that may be integral with bladder 22 or secured thereto in sealing engagement therewith, establishes communication between atmosphere and the interior of the apparatus consisting of jug 12 and bladder 22. It will be apparent that when pinch clamp 26 is applied to tubing 24, the fermenting apparatus is a completely closed system.

In the use of the fermenting apparatus shown in FIGS. 1 and 2, fermentable mixture 14 is first introduced into container 12 through neck 16 after which time bladder 22 is secured thereto by C-clamp 18. Residual air within the system is then orally evacuated via tubing 24 and pinch clamp 26 is applied to the tubing. Integral finger grips 28 may be provided on opposite sides of the bladder, if desired, to enable the sides of the bladder to be held apart during evacuation to preclude complete collapse of the bladder before the residual air within container 12 has been withdrawn. After the system has been evacuated and sealed, fermentation begins and gaseous products of fermentation are evolved from the fermentable mixture as indicated at 30. FIG. 1 illustrates the condition of the apparatus shortly after the system has been sealed and before the bladder is distended. In FIG. 2 the bladder is shown distended as fermentation proceeds.

Figure 4:
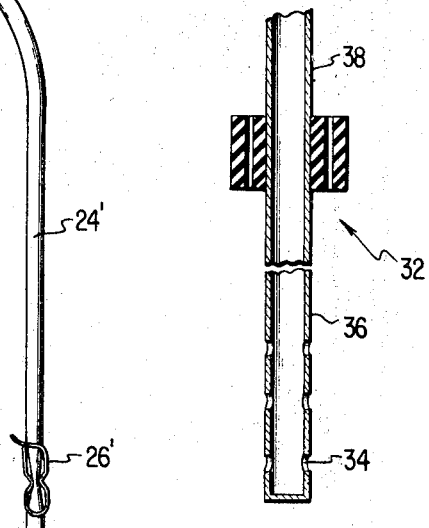
FIG. 4 is a fragmentary view of a siphon attachment that may be used with the apparatus shown in FIGS. 1-3.

When fermentation is complete, as evidenced by the cessation of evolving gaseous products, C-clamp 18 is loosened and bladder 22 is removed. Siphoning adapter 32, shown in FIG. 4, is then inserted into neck 16 and the fermented beverage is siphoned into another container through small openings 34 formed in the body of siphon tube 36 and a piece of rubber tubing, not shown, attached to the upper end 38 of the siphon tube. Any residue remaining in container 12 may then be washed out and after cleaning the bladder and tubing 24, the fermenting apparatus is ready for re-use.

In some instances it may be desirable to limit the outward distention of the bladder during fermentation within certain prescribed limits. For example, if an unusually large amount of beverage is to be produced in a single fermenter, the distention of the bladder might be so great as to create various problems such as storage space requirements during fermentation, etc. By first determining what minimum distention will provide the advantageous results herein disclosed, for a particular size container and volume of fermentable mixture, the maximum distention to be permitted in accordance with such determination may be limited by a rigid or semi-rigid cage surrounding the bladder.

Figure 3:
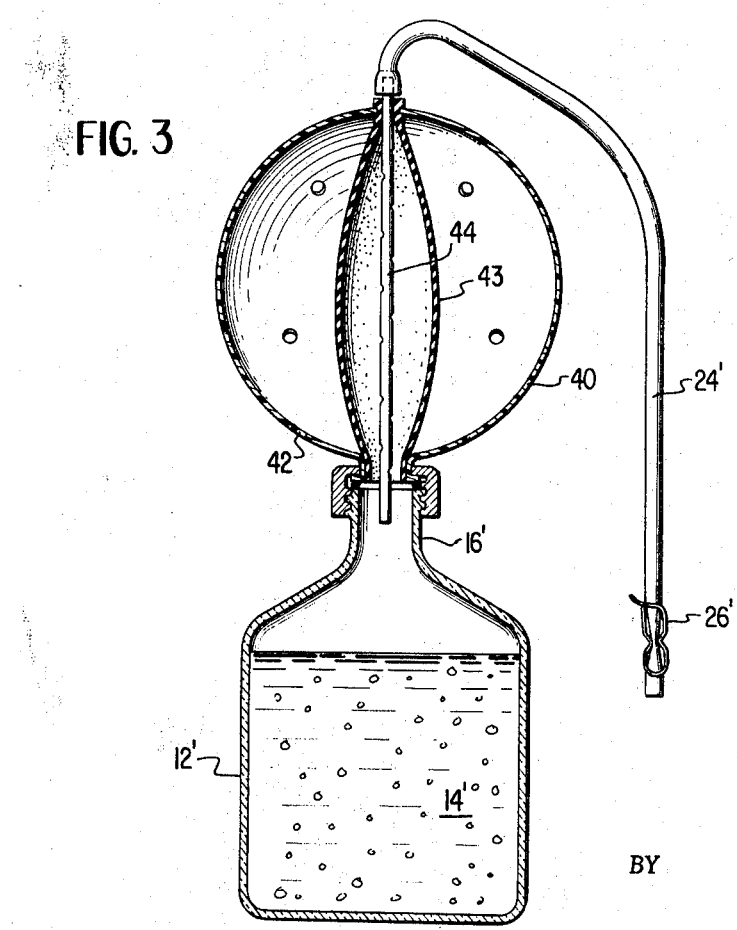
FIG. 3 is a cross-sectional elevation of a second form of the invention.

This latter form of the invention is illustrated in FIG. 3 wherein container 12' containing fermentable mixture 14' has secured to the neck 16' thereof a rigid housing element or cage 40 having vent openings 42. Resilient bladder 43 is secured to cage 40 with the interior thereof communicating with the interior of jug 12'. A rigid perforated open ended tube 44 extends the full length of the bladder and terminates within the confines of jug neck 16' insures that the collapsing bladder will not block evacuation tubing 24' provided with pinch clamp 26'.

The use and operation of the fermenter shown in FIG. 3 is generally the same as that described in connection with FIGS. 1 and 2. The fact that one end of tube 44 extends down within the rigid circumferential confines of neck 16' insures that the collapsing bladder will not block communication with the residual air in container 12' as would be the case if the tube 44 terminated in the upper area of the bladder.

A particular fermentable mixture that produces an unusually palatable grape wine in less than three weeks time, in accordance with the present invention, utilizes the following ingredients:

24 ounces concentrated grape juice
One cake yeast
Four cups sugar
Two teaspoons lemon juice The grape juice concentrate, which may be purchased in frozen form, is first melted and mixed with the sugar which has been dissolved in water. The lemon juice is then added and the mixture is poured into a one-gallon jug. The yeast is dissolved in warm water and added to the mixture after which the contents of the jug are shaken and water is added to bring the level of the mixture below the jug neck, as indicated in FIGS. 1-3. The mixture is then ready for fermentation as hereinbefore described.

We claim:

1. A method of producing a fermented alcoholic beverage, which comprises providing a container and a resilient bladder of stretchable material sufficiently non-porous to prevent the ingress of air under partial vacuum operating conditions within the bladder and to prevent egress of carbon dioxide under internal pressure operating conditions, introducing a fermentable mixture into said container, coupling said resilient bladder to said container above said mixture with the interior of the bladder in open communication with the interior of said container, sealing said bladder and said container from atmosphere, evacuating air from said bladder and said container and reducing the pressure therein below atmospheric, causing the mixture to ferment, passing gases produced during fermentation into said bladder and causing the material of said bladder to stretch and expand due to the pressure of the evolved fermentation gases, and maintaining the evolved gases in said bladder under positive pressure in open communication with said container, whereby the gases received and resiliently contained in the bladder exert positive pressure on said mixture during fermentation.

2. A method in accordance with claim 1, further comprising limiting the expansion of said bladder.

3. Apparatus for producing fermented beverages comprising a fermentable-mixture-receiving container, a resilient bladder of air-impervious material sufficiently non-porous to prevent the ingress of air under partial vacuum operating conditions within the bladder and to prevent egress of carbon dioxide under internal pressure operating conditions, means for sealing said bladder to said container in open communication therewith and with the space within said container and bladder isolated from atmosphere, and a tube communicating with said bladder and said container to evacuate air therefrom, whereby gases evolved during fermentation in said container pass into and expand said bladder and are resiliently contained therein.

4. Apparatus in accordance with claim 3, wherein said container has a neck and said bladder has means for mounting it upon said neck.

5. Apparatus in accordance with claim 5, wherein said mounting means is detachable.

6. Apparatus in accordance with claim 3, wherein said tube has one end passing through said bladder and its opposite end provided with means to block air flow therethrough.

7. Apparatus in accordance with claim 3, further comprising a rigid housing surrounding said bladder for limiting the expansion thereof.

References Cited

UNITED STATES PATENTS 2,131,148   3/1879   Tschirgi ......... 195—144 X

FOREIGN PATENTS 14,276   10/1891   Great Britain.

A. LOUIS MONACELL, Primary Examiner

D. M. NAFF, Assistant Examiner

U.S. Cl. X.R.

99—29, 31, 276

UNITED STATES PATENT OFFICE
CERTIFICATE OF CORRECTION

Patent No. 3,528,817            Dated September 15, 1970

Inventor(s) Harold F. Barrett et al

It is certified that error appears in the above-identified patent and that said Letters Patent are hereby corrected as shown below:

Column 4, line 29, after "neck 16' " insert a period and delete the remainder of the line thereafter and insert -- The other end of the tube is secured to oral -- .

Claim 5, line 1, for "5" insert -- 4 -- .

SIGNED AND
SEALED
DEC 29 1970

(SEAL)
Attest:

Edward M. Fletcher, Jr.
Attesting Officer

WILLIAM E. SCHUYLER, JR.
Commissioner of Patents